US012650492B2

(12) United States Patent
Takeyama et al.

(10) Patent No.: US 12,650,492 B2
(45) Date of Patent: Jun. 9, 2026

(54) MEASUREMENT APPARATUS AND CONTROL APPARATUS

(71) Applicant: FUJIFILM Business Innovation Corp., Tokyo (JP)

(72) Inventors: Kei Takeyama, Ebina (JP); Junichiro Hayakawa, Ebina (JP); Yohei Morita, Ebina (JP); Kaho Oi, Yokohama (JP); Emiko Shiraishi, Tokyo (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 966 days.

(21) Appl. No.: 17/890,775

(22) Filed: Aug. 18, 2022

(65) Prior Publication Data

US 2023/0243924 A1 Aug. 3, 2023

(30) Foreign Application Priority Data

Feb. 2, 2022 (JP) ................................. 2022-014974

(51) Int. Cl.
| | |
|---|---|
| *G01S 7/48* | (2006.01) |
| *G01S 17/42* | (2006.01) |
| *G01S 17/89* | (2020.01) |

(52) U.S. Cl.
CPC ............ *G01S 7/4808* (2013.01); *G01S 17/42* (2013.01); *G01S 17/89* (2013.01)

(58) Field of Classification Search
CPC ........ G01S 7/4808; G01S 17/89; G01S 17/42; G01S 17/894; G01S 7/4876;
(Continued)

(56) References Cited

U.S. PATENT DOCUMENTS 5,648,844 A * 7/1997 Clark .................... G01F 23/292
250/577
2019/0391270 A1 12/2019 Uehara
(Continued)

FOREIGN PATENT DOCUMENTS

| JP | 2019-028039 A | 2/2019 |
|---|---|---|
| JP | 2019-045334 A | 3/2019 |

(Continued)

OTHER PUBLICATIONS

Jun. 27, 2023 Extended Search Report issued in European Patent Application No. 22198297.8.
(Continued)

*Primary Examiner* — Daniel L Murphy
(74) *Attorney, Agent, or Firm* — Oliff PLC

(57) ABSTRACT

A measurement apparatus includes a light emitter that includes: a first light emission region emitting light toward a first area and a second light emission region emitting light toward a second area different from the first area; a light receiver that includes a first light reception region receiving light reflected from the first area and a second light reception region receiving light reflected from the second area; and an acquisition unit that acquires information on the second area, in accordance with light reception results of the second light reception region that receives light reflected from the second area irradiated with the light emitted from the first light emission region.

12 Claims, 10 Drawing Sheets

(58) Field of Classification Search
CPC ...... G01S 7/4863; G01S 7/4815; G01S 17/04;
G01S 7/48; G01S 17/08
USPC ....................................................... 356/4.01
See application file for complete search history.

(56) References Cited

U.S. PATENT DOCUMENTS

| | | |
|---|---|---|
| 2021/0033711 A1 | 2/2021 | Helsloot et al. |
| 2022/0007482 A1 | 1/2022 | Ogura et al. |

FOREIGN PATENT DOCUMENTS

| | | |
|---|---|---|
| JP | 2020-076619 A | 5/2020 |
| JP | 2020-526754 A | 8/2020 |

OTHER PUBLICATIONS

Nov. 25, 2025 Office Action issued in Japanese Aplication No. 2022-014974.

* cited by examiner

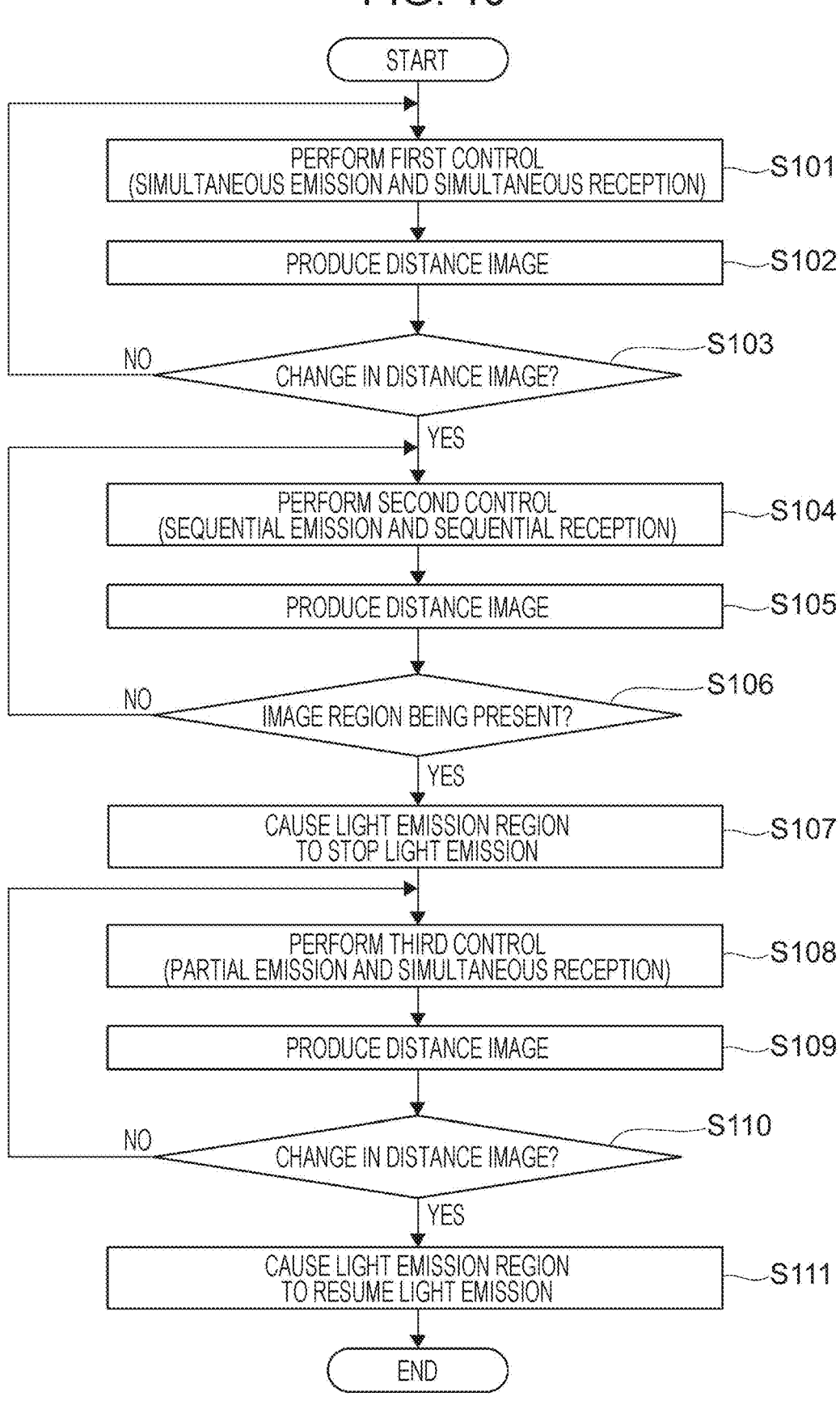

START

PERFORM FIRST CONTROL
(SIMULTANEOUS EMISSION AND SIMULTANEOUS RECEPTION) —S101

PRODUCE DISTANCE IMAGE —S102

NO ◁ CHANGE IN DISTANCE IMAGE? ▷ —S103

YES

PERFORM SECOND CONTROL
(SEQUENTIAL EMISSION AND SEQUENTIAL RECEPTION) —S104

PRODUCE DISTANCE IMAGE —S105

NO ◁ IMAGE REGION BEING PRESENT? ▷ —S106

YES

CAUSE LIGHT EMISSION REGION
TO STOP LIGHT EMISSION —S107

PERFORM THIRD CONTROL
(PARTIAL EMISSION AND SIMULTANEOUS RECEPTION) —S108

PRODUCE DISTANCE IMAGE —S109

NO ◁ CHANGE IN DISTANCE IMAGE? ▷ —S110

YES

CAUSE LIGHT EMISSION REGION
TO RESUME LIGHT EMISSION —S111

END

MEASUREMENT APPARATUS AND CONTROL APPARATUS

CROSS-REFERENCE TO RELATED APPLICATIONS

This application is based on and claims priority under 35 USC 119 from Japanese Patent Application No. 2022-014974 filed Feb. 2, 2022.

BACKGROUND

(i) Technical Field

The present disclosure relates to a measurement apparatus and a control apparatus.

(ii) Related Art

Japanese Unexamined Patent Application Publication No. 2020-76619 discloses a floodlight control apparatus in the related art. The floodlight control apparatus in an optical distance measurement system achieves power saving by reducing power consumption related to floodlight. The floodlight control apparatus differentiates an amount of floodlight in response to the presence or absence of a target. When a target is detected, the floodlight control apparatus changes a floodlight mode of a floodlight unit depending on whether a detection area of the target is a detection region or a non-detection region.

One disclosed measurement apparatus incudes a light emitter including multiple light emission regions emitting light toward multiple areas in an irradiation area and a light receiver including light reception regions receiving light reflected from respective areas. In the measurement apparatus, light emitted from a light emission region corresponding to a light reception region is reflected and then received by the light reception region. Information on an area irradiated with light may be acquired from light reception results of the light reception region. Depending on the condition of the area, accuracy of the acquired information may be degraded.

SUMMARY

Aspects of non-limiting embodiments of the present disclosure relate to more easily acquiring more accurate information than when information on an area irradiated with light is obtained only from light reception results of a light reception region that receives light reflected from an area irradiated with light emitted from a light emission region corresponding to the light reception region.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a measurement apparatus including: a light emitter that includes a first light emission region emitting light toward a first area and a second light emission region emitting light toward a second area different from the first area; a light receiver that includes a first light reception region receiving light reflected from the first area and a second light reception region receiving light reflected from the second area; and an acquisition unit that acquires information on the second area, in accordance with light reception results of the second light reception region that receives light reflected from the second area irradiated with the light emitted from the first light emission region.

BRIEF DESCRIPTION OF THE DRAWINGS

Exemplary embodiment of the present disclosure will be described in detail based on the following figures, wherein:

FIG. 10 is a flowchart illustrating a procedure of a process performed by the controller.

DETAILED DESCRIPTION

Exemplary embodiment of the disclosure is described with reference to the drawings.
Measurement Apparatus 1

Figure 1:
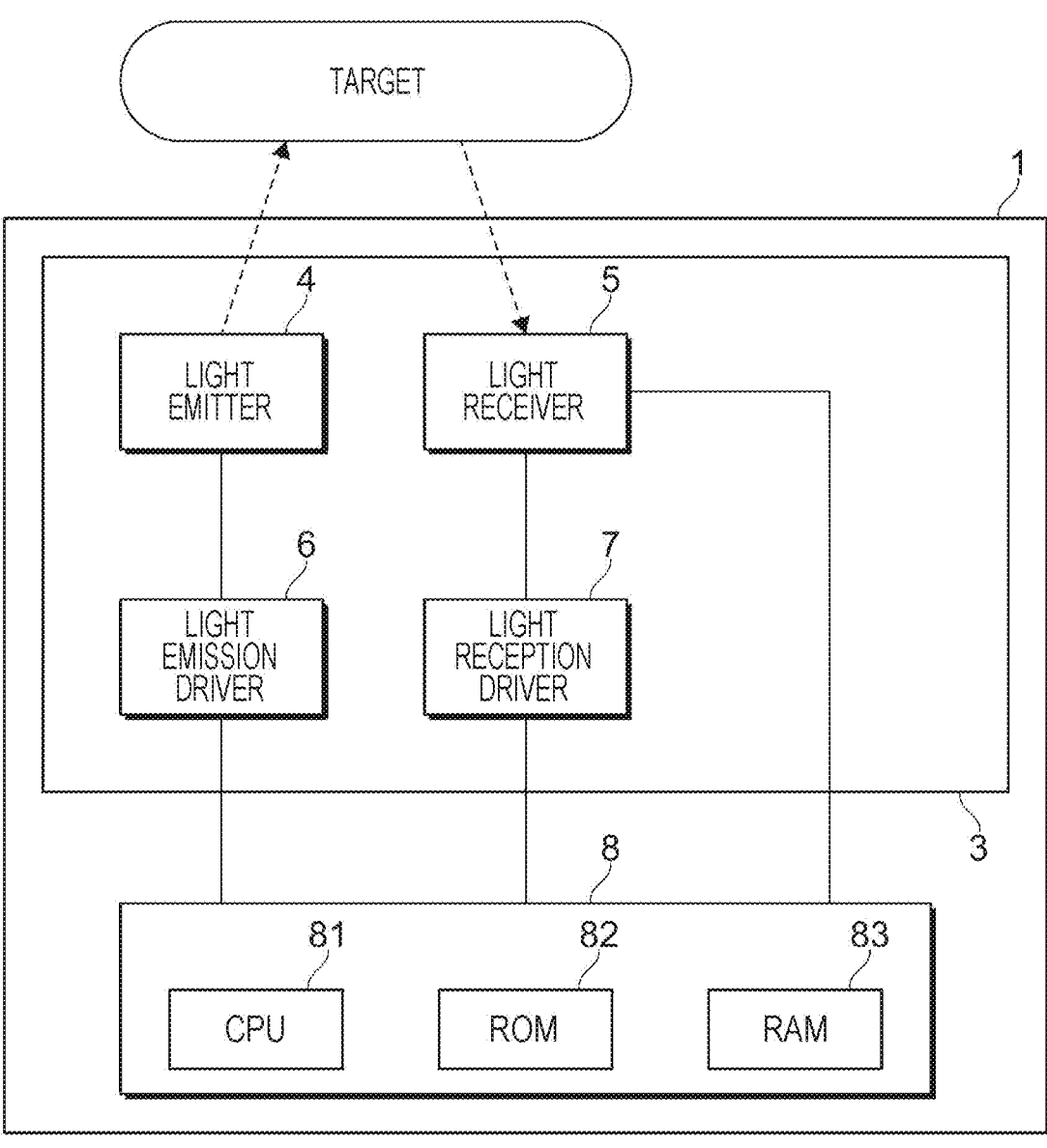
FIG. 1 is a block diagram illustrating an example of a configuration of a measurement apparatus of the exemplary embodiment of the disclosure.

FIG. 1 is a block diagram illustrating an example of a configuration of a measurement apparatus 1 of the exemplary embodiment of the disclosure.

The measurement apparatus 1 measures a distance to a target in accordance with light reception results of a light receiver 5 discussed below that receives light reflected from a target irradiated with light emitted from a light emitter 4 discussed below. The measurement apparatus 1 measures the distance or the like to the target in accordance with Time of Flight (ToF) method. More in detail, the measurement apparatus 1 measures the distance to the target from a timing when light is emitted from the light emitter 4 to a timing when light reflected from the target is received by the light receiver 5. The ToF method incudes indirect ToF method that measures time from a difference between the phase of emitted light and the phase of received light and direct ToF method that directly measures time between the emission of light and the reception of light. Both the direct ToF method and the indirect ToF method are collectively referred to as the ToF method.

Referring to FIG. 1, the measurement apparatus 1 includes an optical device 3 and controller 8. The optical device 3 includes a light emitter 4, light receiver 5, light emission driver 6, and light reception driver 7. The light emitter 4 emits light toward a predetermined irradiation area. The light receiver 5 receives light reflected from a target present within the irradiation area irradiated with the light emitted from the light emitter 4. The light emission driver 6 drives the light emitter 4. The light reception driver 7 drives the light receiver 5. Configurations of the light emitter 4 and light receiver 5 in the optical device 3 are described in detail below.

The controller 8 controls the operation of the light emitter 4 and light receiver 5 in the optical device 3. Through the ToF method, the controller 8 acquires information relating to a distance from the measurement apparatus 1 to the target in accordance with a time duration from when the light emitter 4 emits light to when the light receiver 5 receives light. The controller 8 is an example of an acquisition unit.

Light Emitter 4

Figure 2:
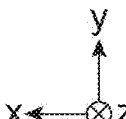
FIG. 2 illustrates a relationship between a light emission surface of a light emitter of the exemplary embodiment and a light irradiation surface irradiated with light emitted from the light emitter.

FIG. 2 illustrates a relationship between a light emission surface 40 of the light emitter 4 of the exemplary embodiment and a light irradiation surface 60 irradiated with light emitted from the light emitter 4. Referring to FIG. 2, the leftward direction of the page of FIG. 2 is an x direction, the upward direction of the page of FIG. 2 is a y direction, and the vertically downward direction perpendicular to the page of FIG. 2 is a z direction. Referring to FIG. 2, the light emission surface 40 and irradiation surface 60 are shifted in the upward and downward directions (±y directions). Actually, the light emission surface 40 and the irradiation surface 60 are arranged to face each other. As illustrated in FIG. 2, the light emitter 4 (the light emission surface 40) is located in a frontward position of the page (–z direction) and the irradiation surface 60 is located in a rearward position of the page (+z direction).

The light emitter 4 is a vertical cavity surface emitting laser (VCSEL). The light emitter 4 includes the light emission surface 40 including multiple VCSELs 43 (in FIG. 3). The VCSELs 43 in light emitter 4 emit light. The VCSEL is a light-emitting element. The VCSELs 43 are not illustrated in FIG. 2.

The light emission surface 40 is partitioned into multiple light emission regions 41, each including at least one VCSEL. For example, the light emission surface 40 includes four light emission regions 41 in the x direction and three light emission regions 41 in the y direction, thus, a total of 12 light emission regions 41. Referring to FIG. 2, to differentiate the light emission regions 41 from each other, the light emission regions 41 may be referred to as the light emission regions A1 through A12 in the order from left to right and from top to bottom (+x direction and +y direction).

The light emission regions 41 are driven by the light emission driver 6 (FIG. 1) and emit light in a mutually independent manner. The driving of the light emission region 41 signifies that the VCSEL in the light emission region 41 is powered and emit light. The mutually independent manner signifies that each light emission region 41 is driven and emit light individually. In response to a control signal from the controller 8 (see FIG. 1), the light emission driver 6 drives the light emission region 41.

The light emission regions A1 through A12 in FIG. 2 thus do not necessarily concurrently emit light. For example, the light emission region A1 may emit light while the light emission region A12 may not emit light.

The irradiation surface 60 is at a distance from the light emission surface 40 and perpendicular to a direction of light emission from the center 40C of the light emission surface 40. The irradiation surface 60 is irradiated with light from the light emitter 4.

Referring to FIG. 2, since the light emitter 4 emits light in the z direction, the irradiation surface 60 expands in the x direction and y direction with distance in the z direction. A central axis Ax (two-dot chain line) that passes the center 60C of the irradiation surface 60 and the center 40C of the light emission surface 40 is perpendicular to the light emission surface 40 and the irradiation surface 60. According to the exemplary embodiment, since the light emission surface 40 is rectangular, the irradiation surface 60 is also rectangular.

Referring to FIG. 2, the irradiation surface 60 is partitioned into multiple irradiation regions 61 in view of the light emission regions 41 of the light emission surface 40. Referring to FIG. 2, the irradiation surface 60 includes four irradiation regions 61 in the x direction and three irradiation regions 61 in the y direction, and thus includes a total of 12 irradiation regions 61. Referring to FIG. 2, to differentiate the irradiation regions 61 from each other, the irradiation regions 61 may be referred to as the light emission regions B1 through B12 in the order from left to right and from top to bottom (+x direction and +y direction).

A light emission region Ai corresponding to a given irradiation region Bi is occasionally referred to as a "corresponding light emission region." For example, the light emission region A1 is a light emission region corresponding to the irradiation region B1. An irradiation region Bi corresponding to a given light emission region Ai is occasionally referred to as a "corresponding irradiation region."

The irradiation regions B1 through B12 are plane-symmetrical with the light emission regions A1 through A12 with respect to the xy plane. For example, the light emission regions A1, A2, A3, and A4 are arranged in the –x direction in this order while the irradiation regions B1, B2, B3, and B4 are arranged in the –x direction in this order.

The light emission region 41 emits light toward the corresponding irradiation region 61. Each irradiation region 61 is irradiated with light emitted from the corresponding light emission region 41. The expression that the light emission region 41 emits light toward the corresponding irradiation region 61 signifies that the optical axis of light emitted from each light emission region 41 is aligned with the corresponding irradiation region 61. Light emitted from all the light emission regions 41 does not necessarily irradiate the corresponding irradiation regions 61. As described in detail below, according to the exemplary embodiment, an area of light emitted from each irradiation region 61 is wider than the area of the corresponding light emission region 41. Each irradiation region 61 may be irradiated with light emitted from an light emission region 41 other than the corresponding light emission region 41.

Figure 3:
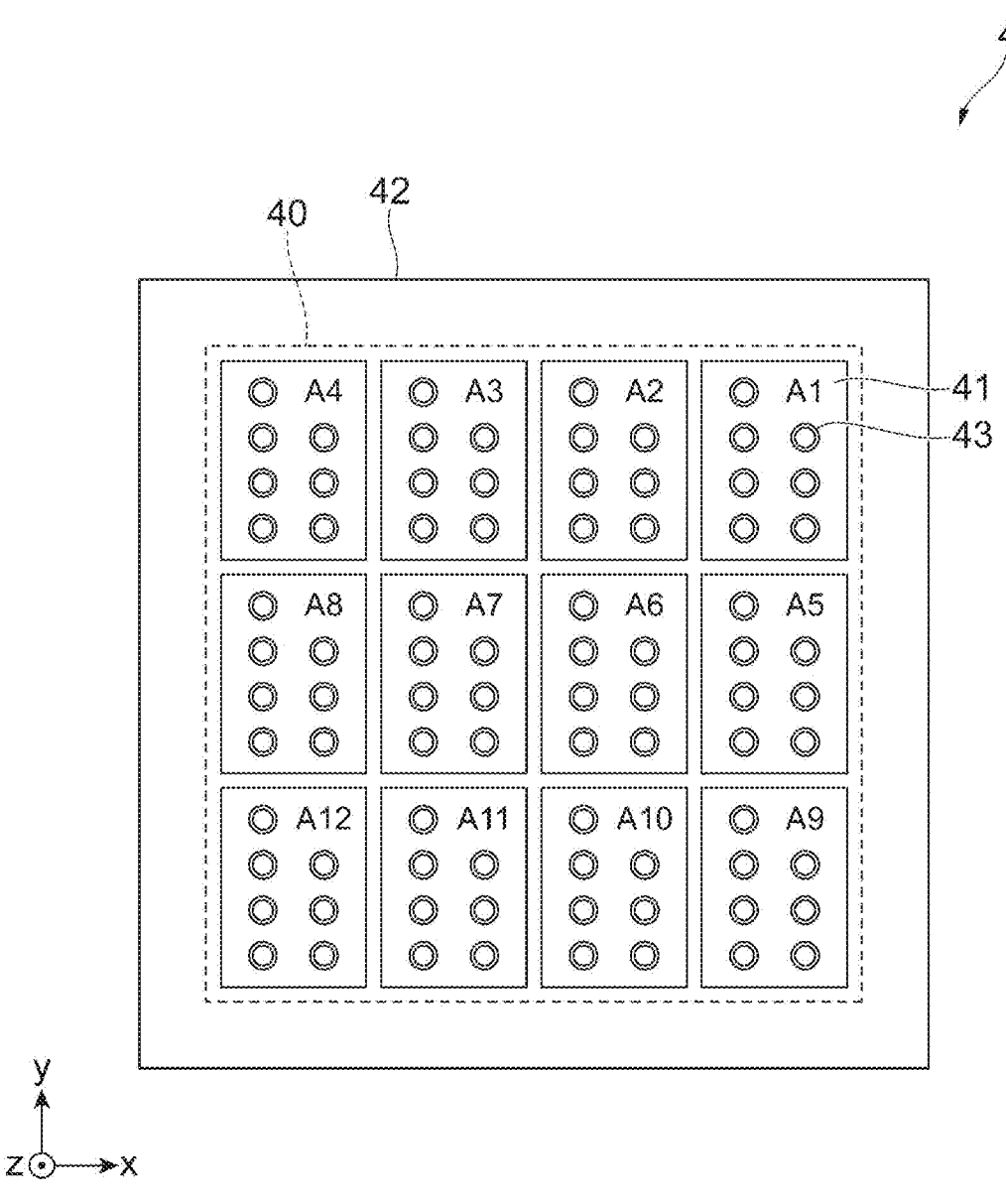
FIG. 3 illustrates an example of the light emitter of the exemplary embodiment.

FIG. 3 illustrates an example of the light emitter 4 of the exemplary embodiment. FIG. 3 illustrates the light emission side of the light emitter 4. The rightward direction of the page of FIG. 3 is the x direction, the upward direction of the page is the y direction, and the frontward direction of the page is the z direction. A plan view of the light emitter 4 is a view when the light emitter 4 is viewed from the z direction.

Referring to FIG. 3, the light emitter 4 includes a board 42 and the light emission surface 40 having the VCSELs 43. More in detail, the board 42 and light emission surface 40 are stacked in the direction of light emission (in the +z direction, namely, frontward direction of the page).

As described above, the light emitter 4 includes 12 light emission regions 41 (the light emission regions A1 through A12) with the VCSELs 43 arranged on the light emission surface 40. Referring to FIG. 3, the light emission regions A1 through A12 are equal in area to each other. Each of the light emission regions A1 through A12 includes the same number of VCSELs 43 (7 VCSELs 43 in this example).

A diffuser (not illustrated) diverges light, emitted from each light emission region 41 in the light emitter 4, in a vertical plane perpendicular to an emission direction (the axis direction of the center axis Ax), and then radiates the diverged light to the irradiation surface 60. Moreover, the light emitted from each light emission region 41 in the light emitter 4 is diverged to an area wider than the corresponding irradiation region 61 and the diverged light is radiated to the irradiation surface 60. The diffuser may be mounted in an optical path of light and may include an optical member including a diffusion plate that diffuses light through light scattering, a diffractive optical element (DOE) that outputs light with an angle of incident light changed and/or a lens.

Figure 4:
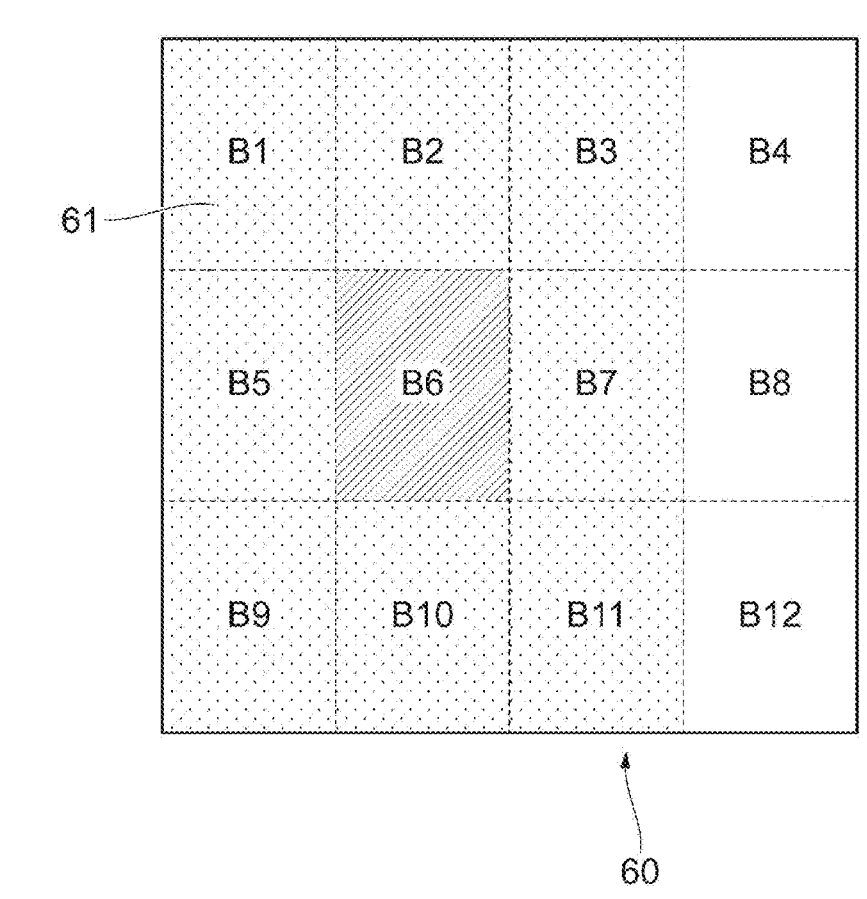
FIG. 4 illustrates an example of an area in the irradiation surface that is irradiated with light emitted from each light emission region of the light emitter.
Figure 4:
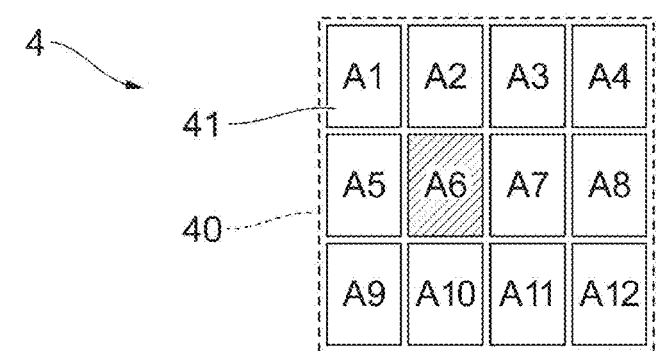
Figure 4:
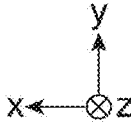

FIG. 4 illustrates an example of an area in the irradiation surface 60 that is irradiated with light emitted from each light emission region 41 of the light emitter 4. FIG. 4 illustrates the example of the area in the irradiation surface 60 that is irradiated with light emitted from the light emission region A6 of the light emitter 4.

As described above, the light emitted from each light emission region 41 in the light emitter 4 is widened and radiated on an area wider than the corresponding irradiation region 61 in the irradiation surface 60. In other words, the light emitted from each light emission region 41 in the light emitter 4 is radiated on both the corresponding irradiation region 61 and other irradiation regions 61 in the irradiation surface 60.

Referring to FIG. 4, the light emitted from each light emission region A6 in the light emitter 4 is radiated not only onto the irradiation region B6 corresponding to the light emission region A6 but also onto irradiation regions B1 through B3, B5, B7, B9 through B11 not corresponding to the light emission region A6.

The light emission region A6 emits light toward the irradiation region B6 on the irradiation surface 60. An amount of light radiated on each of the irradiation regions B1 through B3, B5, B7, B9 through B11 not corresponding to the light emission region A6 is smaller than an amount of light radiated onto the irradiation region B6 corresponding to the light emission region A6.

Light Receiver 5

Figure 5:
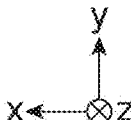
FIG. 5 illustrates a relationship between a light reception surface of the light receiver of the exemplary embodiment and the light irradiation surface.

FIG. 5 illustrates a relationship between the light reception surface 50 of the light receiver 5 of the exemplary embodiment and the irradiation surface 60. In the same manner as with FIG. 2, referring to FIG. 5, the leftward direction of the page is the x direction, the upward direction of the page is the y direction, and the rearward direction of the page is the z direction. Referring to FIG. 5, the light reception surface 50 and irradiation surface 60 are shifted in the vertical direction of the page (±y direction) in a manner such that the light reception surface 50 and irradiation surface 60 face each other. Referring to FIG. 5, the light receiver 5 (the light reception surface 50) is located in the frontward direction of the page (−z direction) and the irradiation surface 60 is located in the rearward direction of the page (+z direction).

The light receiver 5 includes the light reception surface 50 that expands in the x direction and the y direction and includes multiple light reception elements (not illustrated). Each light reception element in the light receiver 5 receives light that is emitted from the light emitter 4 and then reflected from a target present on the irradiation surface 60. The light reception surface 50 is a surface that receives light that is reflected from a target present on the irradiation surface 60 irradiated with the light emitted from the light emitter 4.

A central axis Bx (two-dot chain line) that passes the center 60C of the irradiation surface 60 and the center 50C of the light reception surface 50 is perpendicular to the irradiation surface 60 and the light reception surface 50. According to the exemplary embodiment, like the light emission surface 40 (see FIG. 2) and irradiation surface 60, the light reception surface 50 is also rectangular.

Like the light emission regions 41 in the light emission surface 40 (FIG. 2) and the irradiation regions 61 in the irradiation surface 60, the light reception surface 50 is also partitioned into multiple light reception regions 51. Referring to FIG. 5, the light reception surface 50 is partitioned into four light reception regions in the x direction, and three light reception regions in the y direction, namely, a total of 12 light reception regions 51. To differentiate the light reception regions 51 from each other, the light reception regions 51 are referred to as light reception regions C1 through C12 from left to right and from top to bottom (+x direction and +y direction) in FIG. 5.

A light reception region Ci corresponding to a given light emission region Ai and irradiation region Bi may be referred to as a "corresponding light reception region." For example, the light reception region C1 corresponds to the light emission region A1 or the irradiation region B1. Conversely, the light emission region Ai corresponding to the light reception region Ci may be referred to a "corresponding light emission region," and the irradiation region Bi corresponding to the light reception region Ci may be referred to as a "corresponding irradiation region."

The light reception regions C1 through C12 are plane-symmetrical with the irradiation regions B1 through B12 with respect to the xy plane. For example, the irradiation regions B1, B2, B3, and B4 are arranged in the −x direction while the light reception regions C1, C2, C3, and C4 are arranged in the −x direction. Each light reception region 51 receives light reflected from a target present in the corresponding irradiation region 61 that is irradiated with light emitted from the light emitter 4.

Each light reception region 51 has multiple light reception elements that are regularly arranged. Each light reception element receives light reflected from the target in the irradiation surface 60 that is irradiated with light emitted from the light emitter 4. Each light reception element then outputs an electrical signal responsive to the received light. The light reception element may be a photodiode or a phototransistor.

Each light reception region 51 is independently driven by the light reception driver 7 (see FIG. 1) and performs a light reception operation. The driving of the light reception region 51 signifies that a light reception element in the light reception region 51 transitions from a light reception disabled state to a state enabled to receive light and output the electrical signal. The phrase "independently driven" signifies the state in which each light reception region 51 individually driven is enabled to receive light and output the electrical signal. The light reception driver 7 drives each light reception region 51 in response to a control signal from the controller 8 (see FIG. 1).

Upon receiving light, the light reception elements in each light reception region 51 output to the controller 8 the electrical signal responsive to the received light.

Controller 8

Returning to FIG. 1, the controller 8 includes a central processing unit (CPU) 81, read-only memory (ROM) 82, and random-access memory (RAM) 83.

The CPU 81 is an example of a processor and implements elements described below by loading a variety of programs stored on the ROM 82 or the like to the RAM 83 and then executing the loaded programs. The RAM 83 is used as a working area of the CPU 81. The ROM 82 stores a variety of programs to be executed by the CPU 81.

The programs to be executed by the CPU 81 may be delivered in a recorded form on one of magnetic recording media including a magnetic recording medium (such as a magnetic tape or magnetic disk), optical storage medium (such as an optical disk), magnetooptical recording medium, and semiconductor memory. The programs to be executed by the CPU 81 may also be delivered via a communication network, such as the Internet.

In the exemplary embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiment described herein, the term "processor" is broad enough to encompass one processor or plural processors in collaboration which are located physically apart from each other but may work cooperatively. The order of operations of the processor is not limited to one described in the exemplary embodiment herein, and may be changed.

As described above, the controller 8 controls the operation of the light emitter 4 using the light emission driver 6 and controls the operation of the light receiver 5 using the light reception driver 7.

The controller 8 acquires an electrical signal output from the light reception elements in the light reception region 51 of the light receiver 5. Using the ToF method described above, the controller 8 produces a distance image, representing a distance between the measurement apparatus 1 and a target, in accordance with the electrical signal acquired from the light reception region 51. Moreover, the controller 8 performs a predetermined arithmetic process on the electrical signal acquired from the light reception elements in the light receiver 5 to calculate the distance between the measurement apparatus 1 and the target and produce the distance image.

The controller 8 controls the operation of the light emitter 4 in accordance with the distance image acquired from results of receiving light from the light receiver 5.

Distance Image 100 Acquired by Controller 8

Figure 6A:
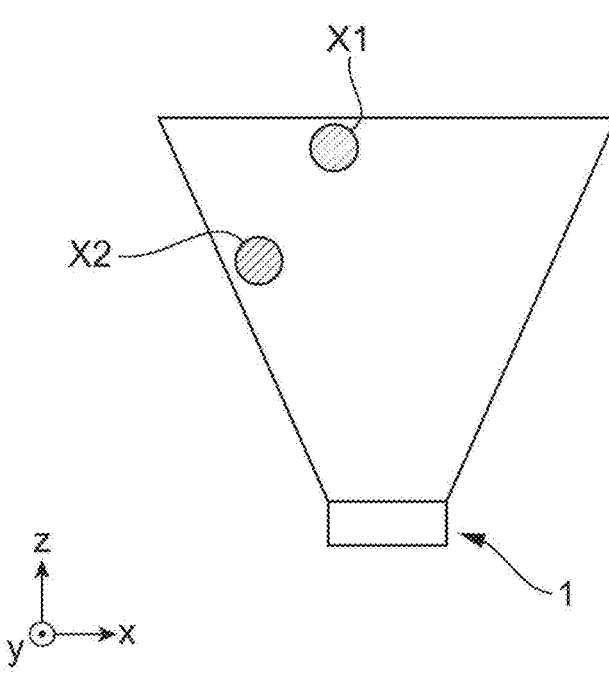
FIGS. 6A and 6B illustrate distance images produced by a controller.
Figure 6B:
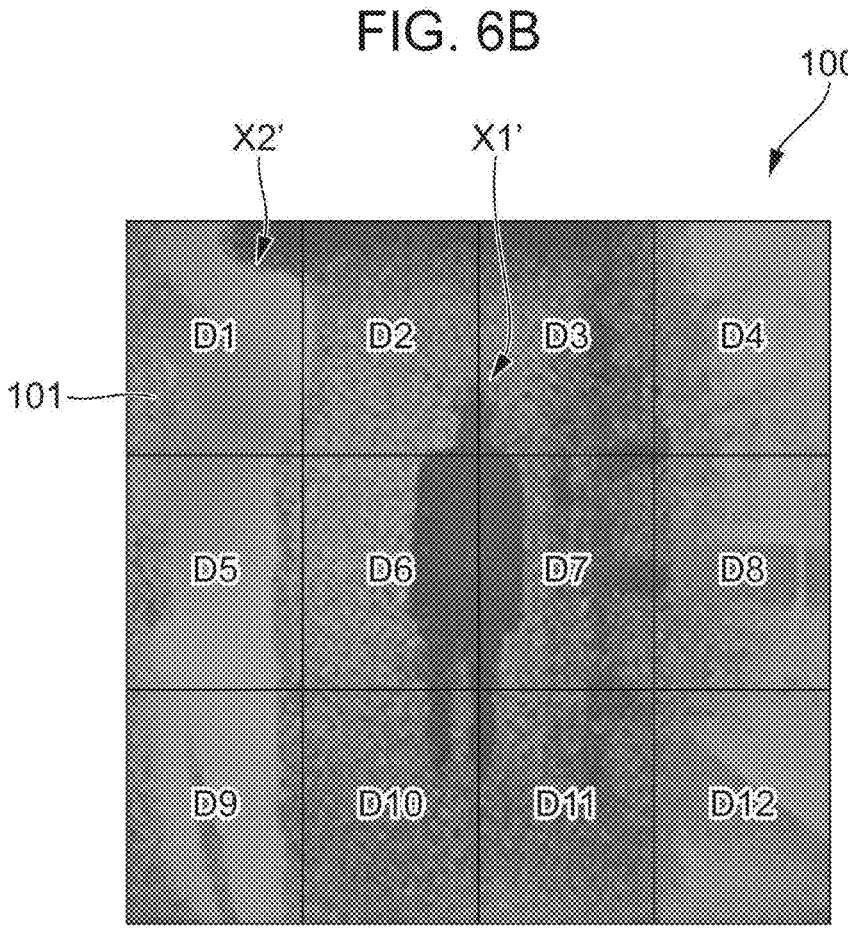

FIGS. 6A and 6B illustrate a distance image 100 produced by the controller 8. FIG. 6A illustrates an example of a positional relationship between the measurement apparatus 1 and the target serving as a measurement target of the measurement apparatus 1. FIG. 6B illustrates an example of the distance image 100 produced by the controller 8 when the target at a position indicated in FIG. 6A is measured by the measurement apparatus 1.

The distance image 100 in FIG. 6B is acquired when all the light emission regions 41 in the light emitter 4 are lit to emit light and light reflected from a target is received by all the light reception regions 51 in the light receiver 5. The distance image 100 in FIG. 6B is similarly acquired when the light emission regions 41 in the light emitter 4 are lit with one region or multiple regions at a time to emit light while the light reception regions 51 in the light receiver 5 receive light reflected from the target.

Referring to FIG. 6B, the distance image 100 includes multiple image regions 101 corresponding to the irradiation regions 61 in the irradiation surface 60 (see FIG. 5) and the light reception regions 51 in the light reception surface 50 (see FIG. 5). Referring to FIG. 6B, the distance image 100 includes 12 image regions 101, namely, four image regions 101 in the lateral direction of the page corresponding to the ±x directions of the irradiation surface 60 and the light reception surface 50 and three image regions 101 in the vertical direction of the page corresponding to the ±y directions of the irradiation surface 60 and the light reception surface 50. To differentiate the image regions 101 from each other, the image regions 101 are designated with image regions D1 through D12 from left to right and from top to bottom in FIG. 6B.

The image region Di in the distance image 100 is obtained when the light reception region Ci in the light reception surface 50 receives light that is reflected from a target in the irradiation region Bi in the irradiation surface 60. The image region Di corresponding to the irradiation region Bi and the light reception region Ci may also be referred to as a "corresponding image region." Conversely, the irradiation region Bi corresponding to the image region Di may be referred to as a "corresponding irradiation region," and the light reception region Ci corresponding to the image region Di may be referred to as a "corresponding light reception region."

Each image region 101 in the distance image 100 includes multiple pixels corresponding to light reception regions of the corresponding light reception region 51. In the distance image 100, a pixel value of each pixel of the image region 101 corresponds to a distance, between the measurement apparatus 1 and the target, calculated from the electrical signal output from each light reception element of the light reception region 51.

Referring to FIG. 6A, person X1 and person X2 serving as targets are located at positions away from the measurement apparatus 1 by predetermined distances. The person X1 is located at the irradiation regions B2, B3, B6, and B7, and the person X2 is located at the irradiation regions B1 and B5. The distance between the measurement apparatus 1 and the person X1 (for example, as long as about 3 m) is longer than the distance between the measurement apparatus 1 and the person X2 (for example, as long as about 1 m).

Referring to FIG. 6B, the distance image 100 displays an outline X1' representing the person X1 and an outline X2' representing the person X2 using pixels included in the image regions 101. Moreover, the outline X1' appears on the image regions D2, D3, D6, and D7 of the distance image 100 corresponding to the irradiation regions B2, B3, B6, and B7 and the outline X2' appears on the image regions D1 and D5 of the distance image 100 corresponding to the irradiation regions B1 and B5. The distance between the measurement apparatus 1 and the person X1 serving as the target and the distance between the measurement apparatus 1 and the person X2 serving as the target are obtained from the pixel values of the pixels forming the outline X1' and outline X2' in the distance image 100.

The measurement apparatus 1 measures the distance to the target in accordance with the results obtained when the light receiver 5 receives light reflected from the target irradiated with light emitted from the light emitter 4. If the distance between the measurement apparatus 1 and the target is too short, the accuracy of the obtained distance image 100 may be degraded and it may be difficult to accurately measure the distance to the target.

Figure 7A:
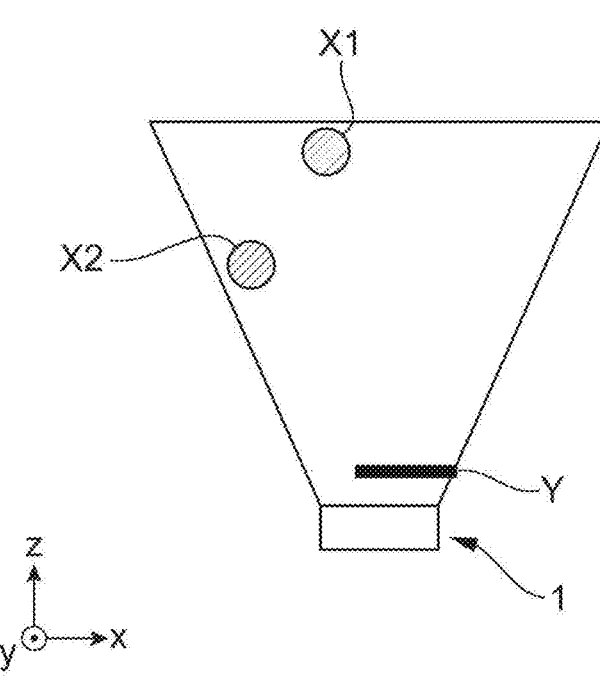
FIGS. 7A and 7B illustrate a distance image that is produced by the controller when a target is located closer to a measurement apparatus than in the example illustrated in FIG. 6A.
Figure 7B:
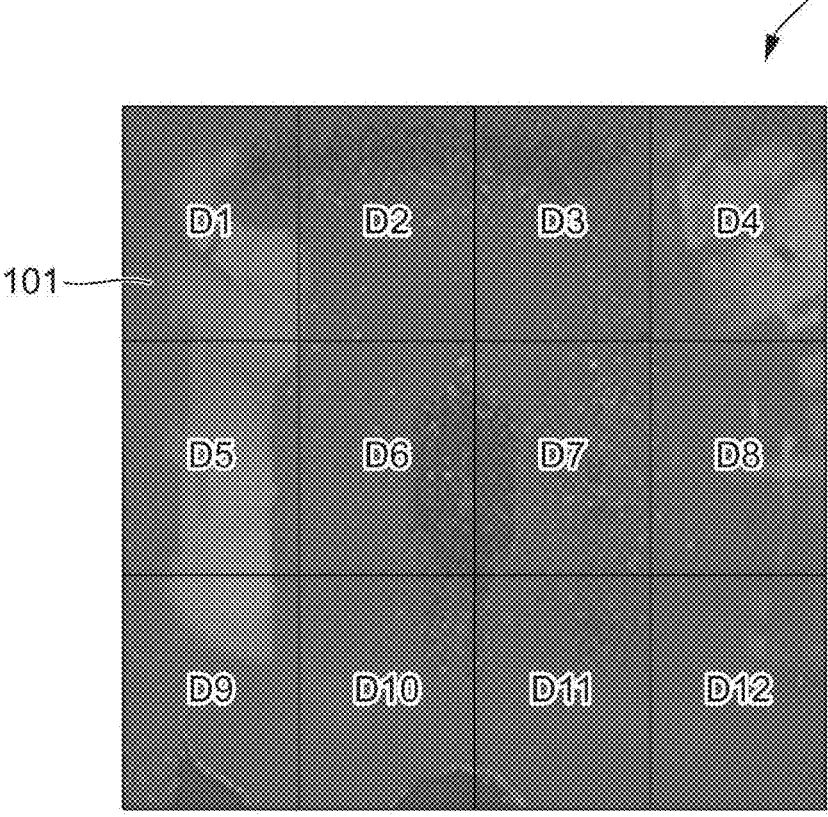

FIGS. 7A and 7B illustrate the distance image 100 that is produced by the controller 8 when the target is located at a position closer to the measurement apparatus 1 than in the case illustrated in FIG. 6A. FIG. 7A illustrates an example of the positional relationship between the measurement apparatus 1 and the target serving as a measurement target of the measurement apparatus 1. FIG. 7B illustrates an example of the distance image 100 acquired by the controller 8 when the target at the position illustrated in FIG. 7A is measured by the measurement apparatus 1.

FIG. 7A illustrates a name card Y serving as another target closer to the measurement apparatus 1 than the person X1 and the person X2. For example, the distance between the measurement apparatus 1 and the name card Y is about one three-hundredth of the distance (for example, about 10 cm) between the measurement apparatus 1 and the person X1. In this example, the name card Y is located at irradiation regions B9 through B12.

It is known that an amount of light radiated to an object away from a light source by a given distance is proportional to the reciprocal of the square of the distance (inverse square law). As described above, the distance between the measurement apparatus 1 and the name card Y is shorter than the distance between the measurement apparatus 1 and the person X1. The amount of light radiated to the name card Y from light emission regions A9 through A12 is higher than an amount of light radiated to the person X1 from light emission regions A2, A3, A6, and A7.

As the amount of light reflected from the name card Y increases, light reception elements present at a location different from the location of the name card Y, in the light reception regions C9 through C12 corresponding to irradiation regions B9 through B12, are more likely to receive light. The light reflected from the name card Y is more likely to be received not only by the light reception regions C9 through C12 corresponding to the irradiation regions B9 through B12 but also by other light reception regions C1 through C8 not corresponding to the irradiation regions B9 through B12.

As a result, the accuracy of the distance image 100 obtained by receiving light from the light receiver 5 may be lowered. Specifically, referring to FIG. 7B, in image regions D9 through D12 corresponding to irradiation regions B9 through B12 where the name card Y is located, the distance image 100 has a smaller difference between pixel values and becomes blurred. Similarly, also, in the other image regions D1 through D8 not corresponding to the irradiation regions B9 through B12, the distance image 100 has a smaller difference between pixel values and becomes blurred. In the distance image 100, the outlines of the person X1 and person X2 and name card Y serving as targets are less likely to appear. Depending on the pixel values of the distance image 100, the distance between the measurement apparatus 1 and the target may be difficult to acquire.

The distance between the measurement apparatus 1 and the target acquired from the pixel values of the distance image 100 is affected by the amount of light received by each light reception element of the light receiver 5 and by time from the emission of light from the light emitter 4 to the reception of light by the light receiver 5. If a target is located closer to the measurement apparatus 1, an accurate distance measurement is difficult by simply reducing the amount of light received by the light reception surface 50 corresponding to the target (in this case, the light reception regions C9 through C12 corresponding to the irradiation regions B9 through B12 where the name card Y is located). For this reason, if a target is located closer to the measurement apparatus 1, the accuracy may drop more.

According to the exemplary embodiment, if the target is located closer to the measurement apparatus 1, the distance between the measurement apparatus 1 and the target may be difficult to measure, and the light emission region 41 corresponding to the irradiation region 61 where the target is located is caused to stop emitting light. The distance image 100 is acquired using the light emitted from other light emission regions 41 not corresponding to the irradiation regions 61 where the target is located.

Figure 8:
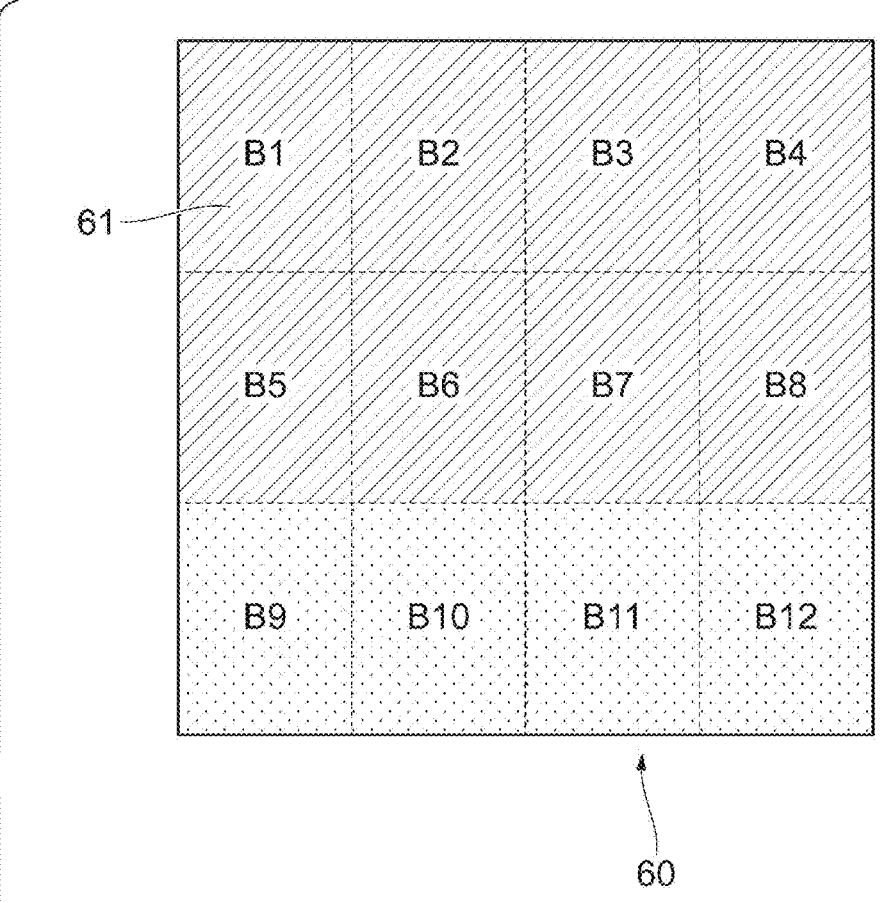
FIG. 8 illustrates the light emission region in the light emitter emitting light and the area of the irradiation surface irradiated with light emitted from the light emission region.
Figure 8:
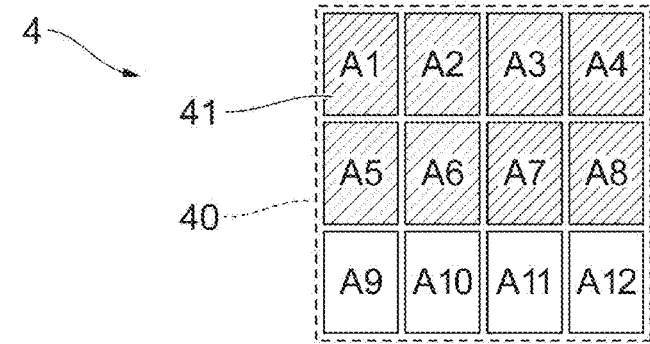
Figure 8:
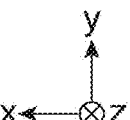
Figure 9:
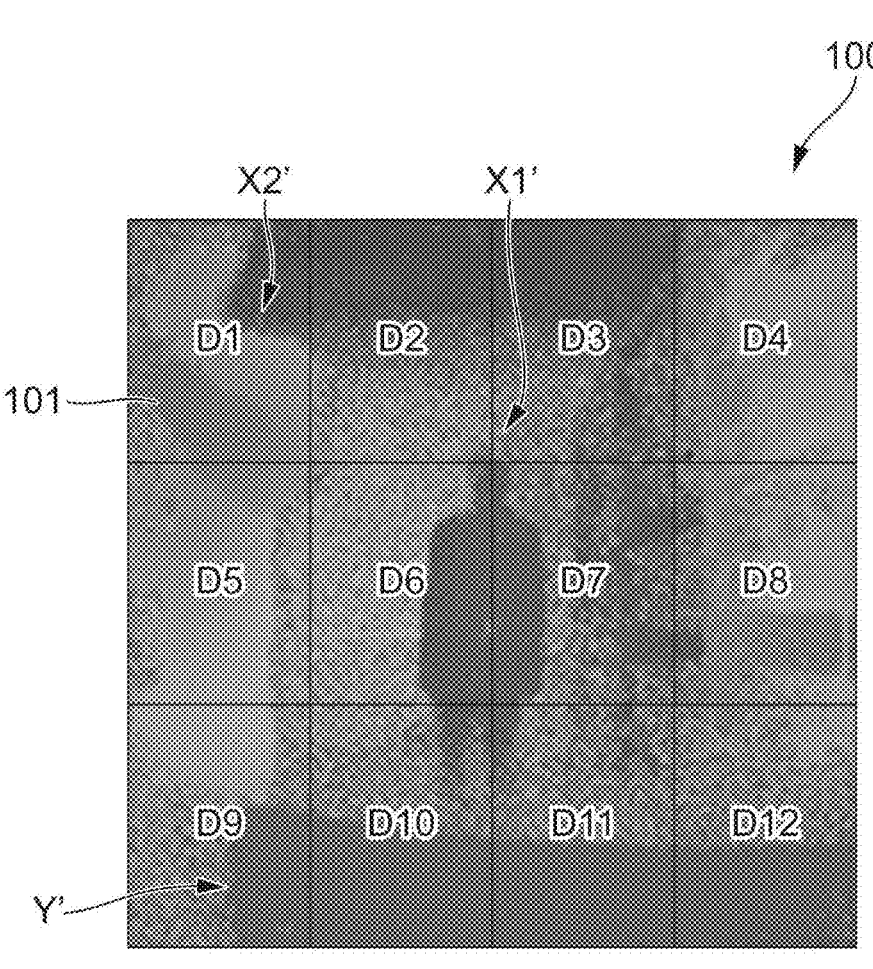
FIG. 9 illustrates an example of the distance image acquired by the controller when light is emitted from the light emission region in the light emitter in the state in FIG. 8 and the targets at locations illustrated in FIG. 7A are measured by the controller.

FIG. 8 illustrates the light emission regions 41 in the light emitter 4 emitting light and an area of the irradiation surface 60 that is irradiated with the light emitted from the light emission regions 41. FIG. 9 illustrates an example of the distance image 100 obtained by the controller 8 when light is emitted from the light emission regions 41 in the light emitter 4 in the state illustrated in FIG. 8 and the measurement apparatus 1 measures the target at the position illustrated in FIG. 7A.

Referring to FIG. 8, from among the light emission regions 41 in the light emitter 4, the light emission regions A9 through A12 corresponding to the irradiation regions B9 through B12 where the name card Y is located stop emitting light. On the other hand, the other light emission regions A1 through A8 not corresponding to the irradiation regions B9 through B12 emit light as illustrated in FIG. 8.

The irradiation regions B1 through B8 in the irradiation surface 60 are irradiated with light emitted from the corresponding light emission regions A1 through A8.

The irradiation regions B9 through B12 in the irradiation surface 60 are not irradiated with light from the corresponding light emission regions A9 through A12. On the other hand, an area surrounding the irradiation regions B1 through B8 is also irradiated with light emitted from the light emission regions A1 through A8. The irradiation regions B9 through B12 are irradiated with part of the light emitted from the non-corresponding light emission regions A1 through A8. In this example, the irradiation regions B9 through B12 are largely irradiated with part of the light emitted from the light emission regions A5 through A8 corresponding to the irradiation regions B5 through B8 adjacent to the irradiation regions B9 through B12. Although the irradiation region B9 is not irradiated with light from the corresponding light emission region A9, the irradiation region B9 is still irradiated with light emitted from the light emission regions A5 and A6 adjacent to the light emission region A9.

When the corresponding light emission regions A9 through A12 stop emitting light, an amount of light emitted from the non-corresponding light emission regions A1 through A8 and radiated to the irradiation regions B9 through B12 is smaller than when the corresponding light emission regions A9 through A12 emit light. In other words, in comparison with when the light emission regions A9 through A12 emit light, an amount of light radiated to the name card Y present in the irradiation regions B9 through B12 becomes small, and an amount of light reflected from the name card Y in the irradiation regions B9 through B12 becomes small.

The amount of light reflected from the name card Y in the irradiation regions B9 through B12 becomes thus smaller. In comparison with when the light emission regions A9 through A12 emit light, a large increase in the amount of light that is reflected from the name card Y and then received by the light reception regions C9 through C12 may be controlled. In the distance image 100, a clear image may be more easily obtained in the image regions D9 through D12 corresponding to the light reception regions C9 through C12.

The amount of light reflected from the name card Y in the irradiation regions B9 through B12 becomes smaller. In comparison with when the light emission regions A9 through A12 emit light, the light reflected from the name card Y is likely to be received by the light reception region C1 through C8 not corresponding to the irradiation regions B9 through B12. In this way, the image regions D1 through D8 corresponding to the light reception region C1 through C8 may more likely obtain a clear image in the distance image 100.

Referring to FIG. 9, the outline X1' of the person X1, the outline X2' of the person X2, and the outline Y' of the name card Y may appear more clearly in the distance image 100.

If the outline of each target appears in the distance image 100 as illustrated in FIG. 9, the distance between the measurement apparatus 1 and the target may be measured in accordance with the pixel values of the pixels forming the outline of the target in the measurement apparatus 1. In addition, if the outline of the target appears in the distance image 100, the controller 8 processes the pixel values of the pixels, forming the outline of the target in the distance image 100, as distance information about the distance between the measurement apparatus 1 and the target.

In this example, the distance between the measurement apparatus 1 and the person X1 may be acquired in accordance with the pixel values of the pixels forming the outline X1', the distance between the measurement apparatus 1 and the person X2 may be acquired in accordance with the pixel values of the pixels forming the outline of the outline X2', and the distance between the measurement apparatus 1 and the name card Y may be acquired in accordance with the pixel values of the pixels forming the outline Y'.

As described above, each of the light emission regions A1 through A8 in the light emitter 4 corresponds to a first light emission region, and each of the light emission regions A9 through A12 in the light emitter 4 corresponds to a second light emission region. Each of the light reception regions C1 through C8 in the light receiver 5 corresponds to a first light reception region and each of the light reception regions C9 through C12 in the light receiver 5 corresponds to a second light reception region. Furthermore, each of the irradiation regions B1 through B8 in the irradiation surface 60 corresponds to a first area and each of the irradiation regions B9 through B12 in the irradiation surface 60 corresponds to a second area.

The irradiation regions B9 through B12 serving as an example of the second area reflects light emitted from each of the light emission regions A1 through A8 serving as an example of the first light emission region and the light reception regions C9 through C12 serving as an example of the second light reception region receives the reflected light. Based on the light reception results of the light reception regions C9 through C12, the controller 8 acquires the image regions D9 through D12 of the distance image 100 serving as information related to the irradiation regions B9 through B12 serving as the second area.

Even when the light emission region 41 corresponding to the irradiation region 61 where a target (for example, the name card Y) closer to the measurement apparatus 1 is located stops emitting light, the outline of the target may not possibly appear in the corresponding image region 101 of the distance image 100 depending on the location of the target or surface state of the target. In such a case, it is difficult to acquire the distance between the measurement apparatus 1 and the target through the pixel values of the distance image 100.

If the corresponding image region 101 has no outline of the target with the corresponding light emission region 41 stopping light emission, the controller 8 does not use the pixel values of the image region 101 as the distance information and processes the pixel values as noise.

The outline in the image regions 101 in the distance image 100 corresponds to the outer shape of the target. The image regions 101 in the distance image 100 having the outline signifies that the pixels forming the image regions 101 having the sharply changing pixel values are connected along the direction of a surface.

The method of the controller 8 of detecting the presence or absence of an outline in the image regions 101 is not limited to any particular method. The presence or absence of the outline may be detected in accordance with a pixel value change with time in each pixel forming the image region 101 or in accordance with a difference between a pixel forming the image region 101 and an ambient pixel. For example, the controller 8 may monitor the pixel value change with time as an outline detection target in the image regions 101. When a change in the pixel value with time is smaller than a predetermined value, the controller 8 determines that the image regions 101 has an outline. For example, the controller 8 may perform image recognition on an intensity image indicating the distribution of amounts of light received by the light receiver 5 or any other receiver or on data such as a visible-light photograph. The controller 8 may thus detect the presence or absence of an outline in the distance image 100.

The distance image 100 in FIG. 9 is obtained when the light emission regions A9 through A12 stop emitting light, the light emission regions A1 through A8 emit light, and all the light reception regions 51 in the light receiver 5 receive light.

Concerning the pixel values of the image regions 101 (in this case, the image regions D9 through D12) corresponding to the light emission regions 41 (in this example, the light emission regions A9 through A12) in the distance image 100, the controller 8 determines whether to use the pixel values as the distance information or process the pixel values as noise. For example, this determination may be made based on light reception results of each light reception region 51 that receives light reflected from the target that is irradiated with light that the light emission regions 41 successively emit.

Specifically, the controller 8 causes one light emission region selected from the light emission regions A1 through A8 (for example, the light emission region A5) to emit light, and causes one light reception region selected from the light reception regions C9 through C12 (for example, the light reception region C9) corresponding to the light emission regions A9 through A12 that have stopped emitting light to receive light reflected from the target. The controller 8 also causes another light emission region (for example, the light emission region A6) selected from the light emission regions A1 through A8 to emit light and causes another light reception region (for example, the light reception region C9) selected from the light reception regions C9 through C12 corresponding to the light emission regions A9 through A12 that have stopped emitting light to receive the light reflected from the target.

A pixel value of the distance image 100 (the pixel value of the image region D9) obtained from light reception results of one light reception region (the light reception region C9) having received light emitted from one light emission region (the light emission region A5) is compared with a pixel value of the distance image 100 (a pixel value of the image region D9) obtained as light reception results of one light reception region (the light reception region C9) having received light emitted from another light emission region (the light emission region A6). If these pixel values are equal to each other, the controller 8 use the pixel value of the distance image 100 (the pixel value of the image region D9) as the distance information on the target. On the other hand, if these values are not equal to each other, the controller 8 processes the obtained pixel value of the distance image 100 (the pixel value of the image region D9) as noise.

In this example, the light emission region A5 is an example of the second light emission region that emits light onto the irradiation region B5 serving as the second area. The light emission region A6 is an example of a third light emission region emitting light onto the irradiation region B6 serving as a third area. The term "equal" signifies that the difference between the comparison targets is zero or falls within a predetermined range.

If the pixel values of the distance image 100 obtained from the light from different light emission regions 41 are equal to each other, the pixel values of the distance image 100 are likely to be responsive to the distance between the measurement apparatus 1 and the target. If the pixel values of the distance image 100 obtained from the light from the different light emission regions 41 are equal to each other, the controller 8 uses the pixel values of the distance image 100 as the distance information. Measurement accuracy of the distance between the measurement apparatus 1 and the target may thus be increased.

While the light emission region 41 corresponding to the irradiation region 61 where the target closer to the measurement apparatus 1 is located stops emitting light, the target may move in location, satisfying a condition that is free from the problem that the light reflected from the target causes the distance image 100 to be blurred. In such a case, the light emission region 41 may resume light emission.

As described above, while the light emission regions A9 through A12 stop emitting light, one of the image regions D9 through D12 of the distance image 100 acquired from the light emitted from the light emission regions A1 through A8 may satisfy the condition. In such a case, the controller 8 may cause the light emission regions A9 through A12 corresponding to the image regions D9 through D12 satisfying the condition to resume light emission.

If the name card Y as the target has moved to a location outside the irradiation regions B9 through B12 with the light emission regions A9 through A12 stopping emitting light, an amount of light received by the light reception regions C9 through C12 irradiated with light reflected from the irradiation regions B9 through B12 is insufficient. The distance image 100 may then suffer from any change. For example, the outline of the target in the image regions D9 through D12 corresponding to the irradiation regions B9 through B12 may not appear or the image may be blurred.

While the light emission region 41 corresponding to the irradiation region 61 where the target closer to the measurement apparatus 1 is located stops emitting light, the corresponding image region 101 has the change as described above. The controller 8 causes the corresponding light emission region 41 to resume light emission, based on the assumption that the image region 101 satisfies the condition.

Process of Controller 8

Process to be performed by the controller 8 is described below. FIG. 10 is a flowchart illustrating the process of the controller 8.

The controller 8 perform first control to cause all the light emission regions 41 in the light emitter 4 to emit light and all the light reception regions 51 in the light receiver 5 receive light (simultaneous emission and simultaneous reception) (step S101).

The controller 8 produces the distance image 100 in accordance with reception results of each light reception region 51 in the light receiver 5 under the first control in step S101 (step S102). In other words, the controller 8 produces the pixel of the corresponding image region 101 of the distance image 100 in accordance with the reception results of the light reception elements of each light reception region 51 in the light receiver 5. As described above, the pixel values of the pixels forming each image region 101 corresponds to the distance between the measurement apparatus 1 and the target.

The controller 8 determines whether a predetermined change has occurred in the distance image 100 acquired in step S102 (step S103). The predetermined change refers to a shifting to a state in which it is difficult to acquire the distance between the measurement apparatus 1 and the target in accordance with the pixel values of the pixels forming each image region 101 in the distance image 100. For example, such a state refers to the case in which the entire distance image 100 becomes blurred as illustrated in FIG. 7B.

If the predetermined change has not occurred in the distance image 100 (no path in step S103), the controller 8 returns to step S101 and repeats the process.

If the predetermined change has occurred in the distance image 100 (yes path in step S103), the controller 8 performs second control (sequential emission and sequential reception) to successively receive light (step S104). In the second control, the controller 8 causes the light emission regions 41 in the light emitter 4 to successively emit light and the light reception regions 51 in the light receiver 5 corresponding to the light emission regions 41 having emitted light to successively receive light. For example, the controller 8 causes the light emission region A1 to emit light and the corresponding light reception region C1 to receive light, causes the light emission region A2 to emit light and the corresponding light reception region C2 to receive light, and so on. The controller 8 successively performs this operation on the light emission regions A1 through A12 in the light emitter 4 and the light reception regions C1 through C12 in the light receiver 5.

The controller 8 produces the distance image 100 in accordance with the light reception results of each light reception region 51 under the second control in step S104 (step S105). In other words, the controller 8 produces the pixels of the corresponding image region 101 of the distance image 100 in accordance with the light reception results of each light reception region 51 in the light receiver 5.

The controller 8 determines whether an image region 101 of the distance image 100 acquired in step S105 satisfying a predetermined condition is located (step S106). The image region 101 satisfying the predetermined condition is an image region 101 that, when the light emission region 41 corresponding to that image region 101 emits light, shifts into the state in which the distance between the measurement apparatus 1 and the target is difficult to obtain in accordance with the distance image 100. For example, the image region 101 satisfying the predetermined condition is an image region 101 that has a distance between the measurement apparatus 1 and the target shorter than a predetermined threshold. If there is no image region 101 satisfying the predetermined condition (no path in step S106), the controller 8 returns to step S104 and repeats the process.

If there is an image region 101 satisfying the predetermined condition (yes path in step S106), the controller 8 causes the light emission region 41 to stop emitting light to the irradiation region 61 corresponding to the image region 101 satisfying the predetermined condition (step S107).

The controller 8 performs third control (partial emission/simultaneous reception) (step S108). In the third control, the controller 8 causes, to emit light, the light emission regions 41 other than the light emission regions 41 that are caused to stop light emission in step S107 and causes all the light reception regions 51 in the light receiver 5 to receive light. Referring to FIG. 8, the controller 8 causes the light emission regions A9 through A12 to stop emitting light, causes the light emission regions A1 through A8 to emit light, and causes all the light reception regions C1 through C12 in the light receiver 5 to receive light.

The controller 8 produces the distance image 100 in accordance with the light reception results of each light reception region 51 under the second control in step S104 (step S109). In other words, the controller 8 produces the pixels of the corresponding image region 101 in the distance image 100 in accordance with the light reception results of the light emission elements of each light reception region 51 in the light receiver 5.

Since the light emission region 41 corresponding to the irradiation region 61 where the target closer to the measurement apparatus 1 is located is caused to stop emitting light, the distance image 100 with the target having a clear outline may more likely result as illustrated in FIG. 9.

If the image regions 101 of the distance image 100 have the outline of a target, the controller 8 processes the pixel values of the pixels forming the outline as the distance information related to the distance between the measurement apparatus 1 and the target. If the image regions 101 do not have the outline of a target, the controller 8 does not use the pixel values as the distance information but processes the pixel values as noise.

The controller 8 determines whether a predetermined change has occurred in the image regions 101 in the distance image 100 corresponding to the light emission regions 41 stopping light emission (step S110). The predetermined change includes the state in which the outline of the target disappears or an image becomes blurred.

If no predetermined change has occurred in the image regions 101 (no path in step S110), the controller 8 returns to step S108 and repeats the process.

If the predetermined change has occurred in the image regions 101 (yes path in step S110), the controller 8 causes the corresponding light emission region 41 stopping light emission to resume light emission (step S111). The process of the controller 8 thus ends.

Other Exemplary Embodiments

According to the exemplary embodiment, all the light emission regions 41 in the light emitter 4 are caused to emit light and all the light reception regions 51 in the light receiver 5 are caused to receive light to acquire the distance image 100. The light emission region 41 corresponding to the irradiation region 61 where the target closer to the measurement apparatus 1 is located is caused to stop light emission. The disclosure is not limited to this method.

The measurement apparatus 1 acquires the distance image 100 by causing the light emission regions 41 in the light emitter 4 to successively emit light and causing the light reception regions 51 in the light receiver 5 to successively receive light. The light emission region 41 corresponding to the irradiation region 61 where the target closer to the measurement apparatus 1 is located may be caused to stop light emission. As described above, for example, the light emission regions A9 through A12 corresponding to the irradiation regions B9 through B12 where the name card Y is located are caused to stop light emission, the light reception region C9 receives light emitted from the light emission region A5, the light reception region C10 receives light emitted from the light emission region A6, the light reception region C11 receives light emitted from the light emission region A7, and the light reception region C12 receives light emitted from the light emission region A8. The image regions D9 through D12 of the distance image 100 may thus be obtained.

The target may be closer to the measurement apparatus 1 as described above. In order to acquire the distance image 100 with the target irradiated with light, the accuracy of the distance of the target obtained from the distance image 100 may be higher as the amount of light radiated to the target is smaller.

To acquire the distance image 100, the light emission regions 41 in the light emitter 4 are caused to successively emit light and the light reception regions 51 in the light receiver 5 corresponding to the light emission regions 41 emitting light are caused to receive light. In this case, as well, the light emission region 41 corresponding to the irradiation region 61 where the target closer to the measurement apparatus 1 is located is caused to stop light emission. This may control a large increase in an amount of light radiated to the target and the accuracy of the distance of the target obtained from the distance image 100 may be increased.

In the preceding exemplary embodiment, a light emission region 41 corresponding to an irradiation region 61 where a target closer to the measurement apparatus 1 is located is caused to stop light emission while the irradiation region 61 where the target is located is irradiated with light emitted from a non-corresponding light emission region 41. The amount of light radiated to the target may be reduced. However, the light emission of the light emission region 41 corresponding to the irradiation region 61 where the target closer to the measurement apparatus 1 is located may not necessarily be stopped. For example, the amount of light radiated to the target may be reduced by lowering the amount of light emitted from the light emission region 41.

The measurement apparatus 1 may be considered as an apparatus that determines, from light reception results of the light receiver 5, the presence or absence of a target or the presence or absence of a material that reflects or absorbs light of a predetermined waveform.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A measurement apparatus comprising:
   a light emitter that includes a first light emission region emitting light toward a first area, a second light emission region emitting light toward a second area different from the first area, and a third light emission region emitting light toward a third area different from the first area and the second area;

a light receiver that includes a first light reception region receiving light reflected from the first area, a second light reception region receiving light reflected from the second area, and a third light reception region receiving light reflected from the third area; and an acquisition unit that acquires information on the second area, in accordance with light reception results of the second light reception region that receives light reflected from the second area irradiated with the light emitted from the first light emission region; wherein the light emitter includes a diffuser that diffuses light such that even the second area outside the first area is irradiated with the light emitted from the first light emission region, and that the second area outside the third area is irradiated with the light emitted from the third light emission region, and the acquisition unit sets the information on the second area to be distance information on a distance to a target present in the second area if light reception results of the second light reception region that receives the light reflected from the second area irradiated with the light emitted from the first light emission region are equal to light reception results of the second light reception region that receives the light reflected from the second area irradiated with light emitted from the third light emission region.

2. The measurement apparatus according to claim 1, wherein the acquisition unit sets the information on the second area to be the distance information if the information on the second area acquired in accordance with the light emitted from the first light emission region indicates an outline.

3. The measurement apparatus according to claim 2, wherein if no light is emitted from the second light emission region, the acquisition unit acquires the information on the second area in accordance with the light emitted from the first light emission region.

4. The measurement apparatus according to claim 3, further comprising a controller that controls light emission of the first light emission region and the second light emission region in the light emitter, wherein the controller causes the second light emission region to stop emitting light if the information on the second area acquired in response to the light reception results of the second light reception region that receives the light reflected from the second area irradiated with the light emitted from the second light emission region satisfies a predetermined condition, and wherein the acquisition unit acquires the information on the second area irradiated with the light emitted from the first light emission region.

5. The measurement apparatus according to claim 4, wherein the controller causes the second light emission region to resume light emission if the information on the second area that the acquisition unit has acquired in response to the light emitted from the first light emission region satisfies a predetermined condition.

6. The measurement apparatus according to claim 1, wherein the acquisition unit sets the information on the second area to be noise if the information on the second area acquired in accordance with the light emitted from the first light emission region does not satisfy a predetermined condition.

7. The measurement apparatus according to claim 6, wherein if no light is emitted from the second light emission region, the acquisition unit acquires the information on the second area in accordance with the light emitted from the first light emission region.

8. The measurement apparatus according to claim 7, further comprising a controller that controls light emission of the first light emission region and the second light emission region in the light emitter, wherein the controller causes the second light emission region to stop emitting light if the information on the second area acquired in response to the light reception results of the second light reception region that receives the light reflected from the second area irradiated with the light emitted from the second light emission region satisfies a predetermined condition, and wherein the acquisition unit acquires the information on the second area irradiated with the light emitted from the first light emission region.

9. The measurement apparatus according to claim 1, wherein if no light is emitted from the second light emission region, the acquisition unit acquires the information on the second area in accordance with the light emitted from the first light emission region.

10. The measurement apparatus according to claim 9, further comprising a controller that controls light emission of the first light emission region and the second light emission region in the light emitter, wherein the controller causes the second light emission region to stop emitting light if the information on the second area acquired in response to the light reception results of the second light reception region that receives the light reflected from the second area irradiated with the light emitted from the second light emission region satisfies a predetermined condition, and wherein the acquisition unit acquires the information on the second area irradiated with the light emitted from the first light emission region.

11. The measurement apparatus according to claim 10, wherein the controller causes the second light emission region to resume light emission if the information on the second area that the acquisition unit has acquired in response to the light emitted from the first light emission region satisfies a predetermined condition.

12. A control apparatus comprising:

a processor configured to:

cause a first light emission region of a light emitter to emit light, the light emitter including a first light emission region emitting light toward a first area, a second light emission region emitting light toward a second area different from the first area, and a third light emission region emitting light toward a third area different from the first area and the second area;

cause a second light reception region of a light receiver to receive light reflected from the second area irradiated with light emitted by the first light emission region, the light receiver including a first light reception region receiving light reflected from the first area, a second light reception region receiving light reflected from the second area, and a third light reception region receiving light reflected from the third area, wherein the light emitter includes a diffuser that diffuses light such that even the second area outside the first area is irradiated with the light emitted from the first light emission region, and that the second area outside the third area is irradiated with the light emitted from the third light emission region;

acquire information on the second area, in accordance with light reception results of the second light reception region that receives light reflected from the second area irradiated with the light emitted from the first light emission region; and set the information on the second area to be distance information on a distance to a target present in the second area if light reception results of the second light reception region that receives the light reflected from the second area irradiated with the light emitted from the first light emission region are equal to light reception results of the second light reception region that receives the light reflected from the second area irradiated with light emitted from the third light emission region.

\* \* \* \* \*